Figure 1:
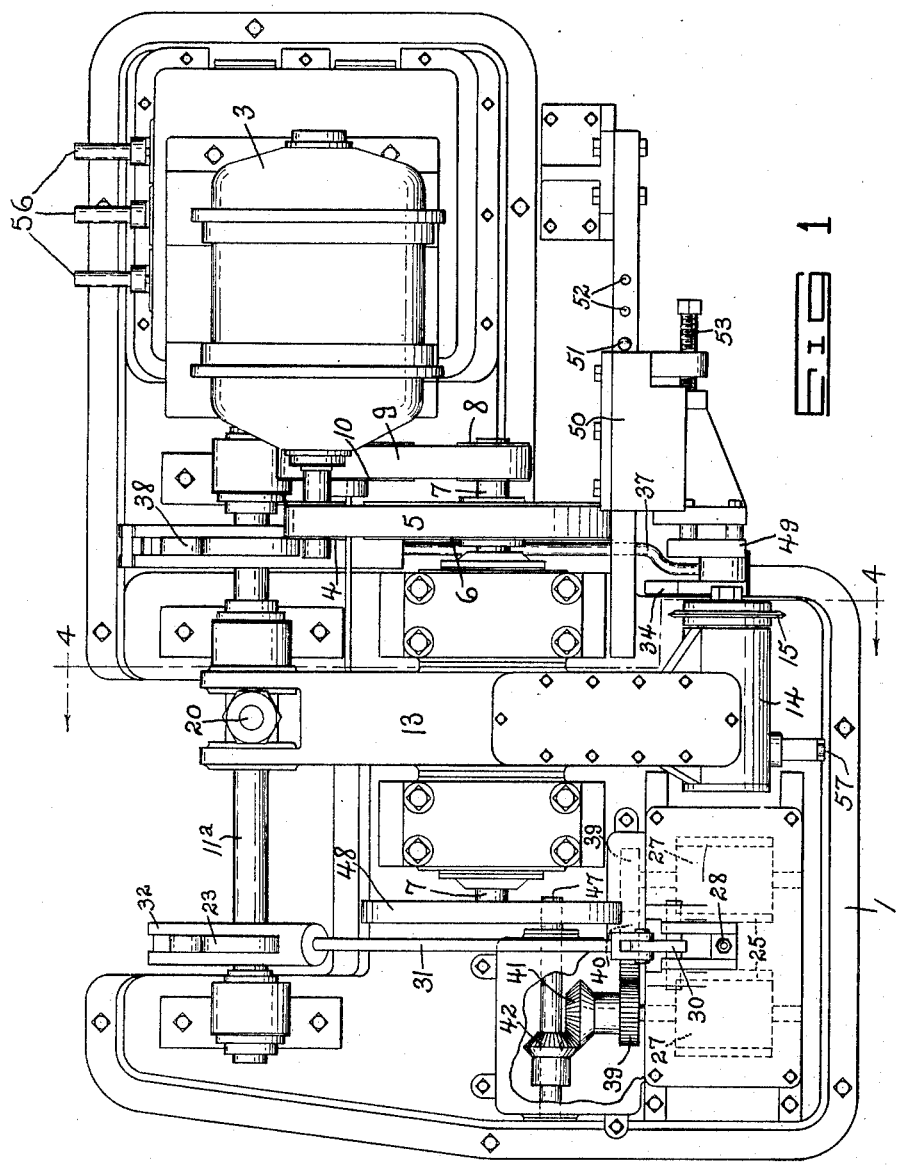

April 14, 1931.　　W. B. EWING　　1,801,038
PIPE CUTTING MACHINE
Filed July 31, 1929　　4 Sheets-Sheet 1

INVENTOR
Kylie B. Ewing
BY
H. E. Dunlap
ATTORNEY

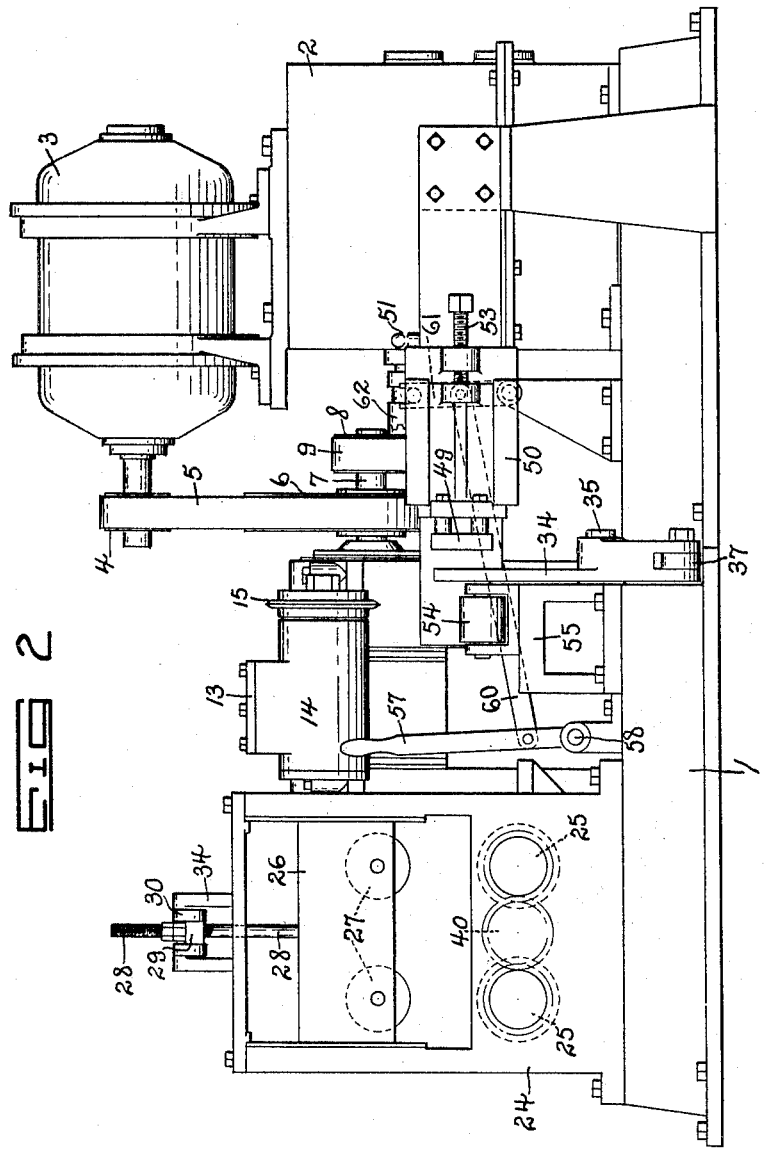

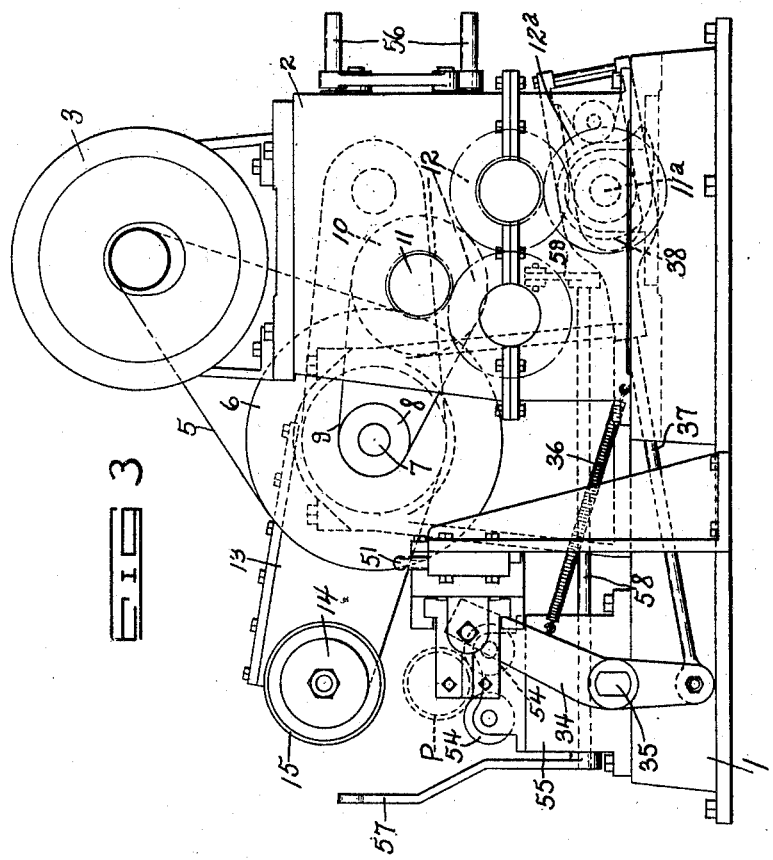

April 14, 1931.　　　W. B. EWING　　　1,801,038
PIPE CUTTING MACHINE
Filed July 31, 1929　　　4 Sheets-Sheet 4
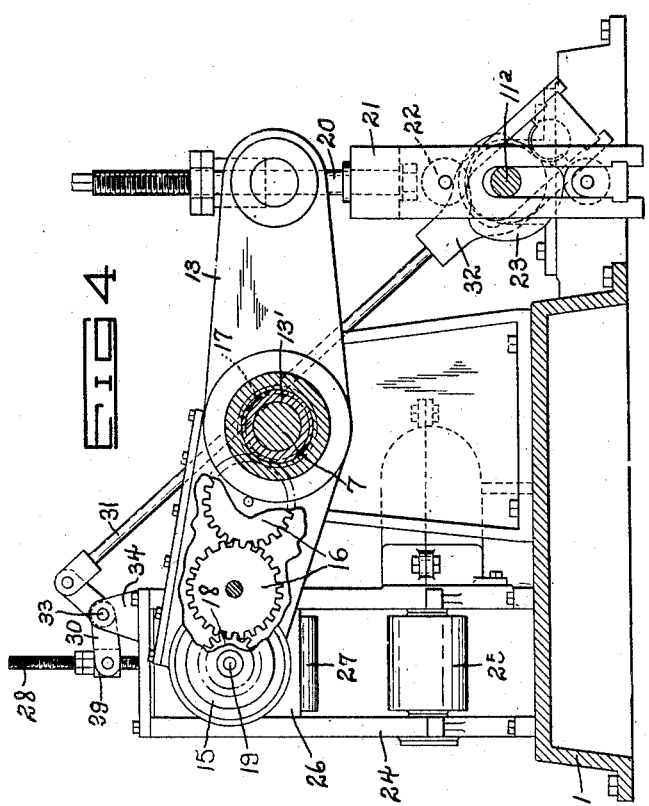

Patented Apr. 14, 1931

1,801,038

UNITED STATES PATENT OFFICE

WYLIE B. EWING, OF WHEELING, WEST VIRGINIA

PIPE-CUTTING MACHINE

Application filed July 31, 1929. Serial No. 382,539.

This invention relates to pipe cutting machines, and more particularly to a machine for cutting pipe, tubing, or the like, into short lengths to be used for pipe nipples, etc.

The primary object of the invention is to provide an improved machine of the character mentioned which is purely automatic in operation, and one which cuts the pipe in an expeditious and effective manner.

A still further object of the invention is to provide means which can be easily and quickly operated to vary the timing of the parts in the cutting of pipes of different diameters and lengths.

With these and other objects in view, the invention resides in the features of construction, arrangement of parts, and combinations of elements, which will hereinafter be fully described, reference being had to the accompanying drawings, in which—

Fig. 1 is a top plan view of the invention;
Fig. 2 is a front side elevation;
Fig. 3 is an end elevation looking at the right hand end of Fig. 1; and—
Fig. 4 is a section on line 4—4, Fig. 1.

Referring to said drawings, the reference numeral 1 designates a base upon which is mounted a housing 2 in which is disposed change speed gears. A motor 3 is mounted on the housing 2 and has its shaft provided with a pulley 4 which drives a belt or chain 5. The belt 5 further extends about a pulley 6 mounted on one end of a shaft 7. The shaft 7 also has a pulley 8 mounted thereon over which is trained a belt or chain 9, said belt in turn being trained over a pulley 10 mounted on the shaft 11 of one of the change speed gears 12, the latter being located in the housing 2 and by means of which gears the shaft 11ª is driven through a gear 12ª mounted on the shaft 11ª, said shaft 11ª extending into the housing.

Referring to Figs. 1, 3 and 4, it will be noted that a rocker arm 13 is pivoted upon the shaft 7 intermediate its ends, a sleeve or bushing 13' being preferably employed between the rocker and shaft. The front end of the rocker arm is provided with a lateral bearing or projection 14 in which latter a circular cutter 15 is rotatably journaled. The cutter 15 is rotated by means of intermeshing gears 16 which are driven from the shaft 7 which are driven by a gear 17 on the shaft 7 and a pinion 18 on the shaft 19 of the cutter.

The rocker arm 13 is of hollow formation and encloses the gears 16 and 17 and pinion 18 so as to provide a housing therefor. The rear end of the rocker arm 13 is bifurcated, as shown in Fig. 1, and by means of a rod 20 has a forked member 21 adjustably secured thereto. The forks of the member 21 straddle the shaft 11ª and thereby guide the member 21 in its vertical movements. A roller 22 is rotatably carried by the member 21 and is engaged by a cam 23 fixed to the shaft 11ª. It will thus be seen that upon rotation of the cam 23, the arm 13 will be rocked to impart bodily vertical reciprocatory motion to the thereby-carried cutter 15.

Referring to Figs. 2 and 4 of the drawings, it will be noted that a housing 24 has provided in the lower portion thereof feed rollers 25 which are journaled in spaced relation. A slide or carrier 26 is mounted in the housing and has feed rollers 27 journaled therein, which latter register and are adapted to cooperate with the rollers 25 so as to feed the pipe to be cut into the machine. A rod 28 is connected to the slide 26 and extends upwardly therefrom and has a member 29 adjustably mounted thereon.

A bell crank 30 is pivoted at one end to the member 29 and at its opposite end is pivoted to a rod 31. Said bell crank is pivoted at 33 to a member 34 carried by the upper end of the housing 24. The opposite end of the rod 31 has a foot 32 which is driven by an eccentric 23 on the shaft 11ª, whereby it will be seen that the slide 26 with its rollers 27 will be moved upwardly and downwardly away from and toward the rollers 25.

Referring to Fig. 3 of the drawings, it will be noted that a knock-off arm 34 is pivoted at 35 and is tensioned by a coil spring 36, the lower end of the knock-off arm having a rod 37 pivoted thereto, which latter is operated by an eccentric mechanism 38 of conventional form that is mounted on the shaft 11ª.

For the purpose of operating the feed-in rollers 25, gears 39 are provided which mesh with a central gear 40. One of the gears 39 has a beveled gear 41 in mesh with a similar beveled gear 42 mounted on the shaft 47. The shaft 47 is driven by means of pulleys and a belt 48 from the shaft 7, as shown in Fig. 1.

A stop 49 is carried by a bracket 50, the latter being slidable on the frame and being held in adjusted position by a pin 51 which is receivable in a selected opening of a series of openings 52 provided therefor. In addition, to obtain finer adjustments of the stop, a screw device 53 of conventional form is provided.

For the purpose of providing a rotatable support for the end of the pipe being cut so as to enable the cutter 15 to rotate the pipe during and by the cutting movement of the cutter, a pair of rollers 54 are provided and are journaled upon a bed 55 arranged beneath the cutter, as shown in Figs. 2 and 3, in the latter figure the pipe to be cut being shown in dotted lines at P.

As shown in Figs. 1 and 3 of the drawings, it will be seen that a series of handles 56 are provided for the change speed mechanism so as to enable selective changing of the speed to be effected in accordance with the varying diameters and lengths of the pipes to be cut.

A manually controlled lever 57 is provided and is mounted on one end of a shaft 58, the latter being shown in Fig. 3, having arm 59 to which is pivoted a rod 60. Said rod 60 is in turn pivoted to a pivoted forked arm 61, the latter operating a clutch 62. The above mentioned clutch mechanism is provided in order to cut random lengths of pipe and is ordinarily not disturbed or operated when a plurality of sections of pipe of the same length are to be cut.

In operation, the length of pipe or tubing is manually placed by the operator on the rollers 25, as shown in Fig. 2, and the machine then started by manipulation of the hand lever 57. The shaft 11ª in its rotation causes the eccentric 23 to bring the idler rollers 27 into engagement with the pipe. The pipe is thus held in frictional engagement with the rollers 25 and the latter are driven by means of the gearing 41, 42, etc., as shown in Fig. 1, thereby feeding the pipe inwardly under and past the cutter until engaged by the stop 49. When the forward end of the tubing abuts the stop 49, the eccentric 23 releases the carrier or slide 26, thereby releasing the pressure of the rolls 27 on the pipe, so that the latter is then stationary and ready for cutting. At this point the eccentric 23, through the member 21, rocks the arm 13, thus bringing the revolving cutter 15 into engagement with the pipe. Said cutter 15 is rotated by means of the gearing 16, 17 and 18 and the pipe is rotatably supported on the rollers 54 and is caused to rotate relative thereto by the rotation of the cutter 15.

After the pipe has been cut, the rocker 13 is moved to its upper or inoperative position and, at the same time, the eccentric 38 operates the knock-off arm 34 to eject the cut section of the pipe out of the machine. The knock-off arm 34 is then restored to its normal position by means of the spring 36, following which the operation supra is repeated, viz., the slide 26 is again moved to bring the feed-in rollers into operative relation to the pipe and the other operations described then follow in the recited order.

From the foregoing, it will be seen that the machine is purely automatic in its operation. In the cutting of pipes of varying diameters, it will be obvious that the greater the diameter of the pipe, the longer the time required for the cutter 15 to sever the pipe. Additionally, it will be noted that the longer the length of the section of pipe to be cut, the longer the time required to feed the pipe against the stop. Accordingly, the hand controls 56 of the change speed gearing are manipulated as desired to change the speed of the machine in accordance with the diameter and length of pipe to be cut.

It will be further understood from the foregoing that the timing of the parts in their operation is such so that as soon as the pipe is stopped by the stop 49 the feed-in rollers cease operation. Thereupon the cutter 15 performs its function and when the cutting has been completed, the knock-off arm 34 enters into operation, thus providing a simple and expeditious mechanism for cutting the pipe into sections.

What is claimed is:—

1. In a pipe cutting machine, a pipe feeding mechanism composed of lower rolls, means to drive said rolls, a vertical slide having rolls to engage the pipe and to hold same engaged with the lower rolls, stop means to engage the pipe to be cut, means to operate the slide to release its rolls from the pipe upon engagement of the pipe with the stop means, a rocker arm having a rotary cutter, means to actuate the cutter, means to rock the arm to engage the cutter with the pipe following engagement of the latter with the stop means and to again rock the arm to move the cutter out of engagement with the pipe upon completion of its cutting, means to support the pipe for turning movements during the action of the cutter, a spring tensioned pivoted knock-off arm and means to actuate the knock-off arm to move the cut section of the pipe out of the machine following completion of the cutting thereof.

2. In a pipe cutting machine, a pipe feeding mechanism composed of lower rolls, means to drive said rolls, a vertical slide having rolls to engage the pipe and to hold same engaged with the lower rolls, stop means to release its rolls from the pipe upon engagement of said pipe with the stop means, a rocker arm having a rotary cutter, means to actuate the cutter, means to rock the arm to engage the cutter with the pipe following engagement of the latter with the stop means and to again rock the arm to move the cutter out of engagement with the pipe upon completion of the cutting, knock-off means, and means to actuate the knock-off means to move the cut section of the pipe out of the machine following completion of the cutting thereof.

3. In a pipe cutting machine, pipe feeding means, stop means, means to operate said feeding means and to render same inoperative when the pipe engages the stop means, a rocker arm, cutting means carried by said rocker arm, means to actuate the cutting means, automatic means to rock said arm for moving the cutting means into engagement with the pipe when the latter engages the stop means and to move the cutting means away from the pipe when the cutting is completed, and knock-off means to eject the cut pipe section from the machine.

4. In a pipe cutting machine, pipe feeding means, stop means, means to operate said feeding means and to render same inoperative when the pipe engages the stop means, rotary cutting means including a rocker arm, means adapted to rotate the cutting means, and means to move the rocker arm for presenting the cutting means in engagement with the pipe when the latter engages the stop means and to move said rocker arm for withdrawing the cutting means from the pipe when the cutting is completed.

5. In a pipe cutting machine, a pipe feeding mechanism composed of lower rolls, means to drive said rolls, a vertical slide having rolls to engage the pipe and to hold same engaged with the lower rolls, stop means to engage the pipe to be cut, means to operate the slide to release its rolls from the pipe upon engagement of the pipe with the stop means, a rocker arm having a rotary cutter, means to actuate the cutter, means to rock the arm to engage the cutter with the pipe following engagement of the latter with the stop means and to again rock the arm to move the cutter out of engagement with the pipe upon completion of its cutting, and means to support the pipe for turning movements during the action of the cutter.

6. In a pipe cutting machine, pipe feeding means including upper and lower sets of rolls, means to rotate one of the sets, means to mount one of the sets for movement into and out of engagement with the pipe, stop means, means to operate said movable set of rolls into engagement with the pipe to feed same and to move the movable set out of engagement with the pipe when the latter engages the stop means, cutting means, means to operate the cutting means, and means to move the cutting means into engagement with the pipe when the latter reaches the stop means and then moves same away from the pipe after the latter has been cut.

7. In a pipe cutting machine, pipe feeding means, a rotary cutter, a rocker arm carrying said cutter, means to feed the pipe step by step throughout a predetermined distance relative to the cutter and then to release the pipe, and automatic means for actuating said rocker arm to present the cutting means in operative position upon release of the pipe and for actuating said rocker arm to withdraw the cutter to inoperative position upon completion of the cutting operation.

8. In a pipe cutting machine, work supporting and advancing means, a shaft, a rocker arm pivoted between its ends on the shaft, a rotatable cutter on the arm, gearing carried by the cutter, the arm and the shaft to rotate the cutter from the shaft, and automatic means including an eccentric for actuating the arm to rock the cutter into and out of engagement with the work at predetermined intervals.

9. In a pipe cutting machine, a feed-in mechanism including upper and lower sets of rolls, means to drive one of the sets, means to mount one of the sets for movement toward and away from the other set, a rocker arm, pipe cutting means carried by said arm, and automatic means for actuating said rocker arm to carry said pipe cutting means to and from operative position at timed intervals following said feeding-in of the pipe, said rocking means including an eccentric and a connection between said eccentric and said rocker arm.

10. In a pipe cutting machine, means to feed the pipe into the machine, a rocker arm, a cutter on the rocker arm, means carried by the arm to rotate the cutter, and means including an eccentric adapted to rock the arm into and out of engagement with the pipe at predetermined intervals.

11. In a pipe cutting machine, rotary means to feed the pipe into the machine for predetermined distances, rotary cutting means, means to operate the cutting means, means to operate the feeding means and to render same inoperative after a predetermined period of time, a rocker arm pivoted intermediate its ends and carrying said cutting means on an end thereof, means connected to the opposite end of said rocker arm whereby the latter is actuated to move said cutting means into engagement with the pipe for a predetermined period of time then to move the cutting means away from the pipe, driving means to rotate both said actuating means of the feeding means and the cutting means, and means to selectively vary the periods of time throughout which the feeding means and the cutting means operate in accordance with the varying diameter and length of the pipe to be cut.

In testimony whereof, I affix my signature.

WYLIE B. EWING.